United States Patent
Diehl et al.

(10) Patent No.: US 11,806,649 B2
(45) Date of Patent: Nov. 7, 2023

(54) ADAPTOR FOR MOUNTING A FILTER TO A HYDRAULIC MANIFOLD

(71) Applicant: Robert Bosch GmbH, Stuttgart (DE)

(72) Inventors: Jim Diehl, Lehighton, PA (US); Oliver Gerhard, Zellingen (DE); Jon Frey, Macungie, PA (US)

(73) Assignees: Bosch Rexroth Corporation, Broadview, IL (US); Robert Bosch GmbH, Stuttgart (DE)

(*) Notice: Subject to any disclaimer, the term of this patent is extended or adjusted under 35 U.S.C. 154(b) by 224 days.

(21) Appl. No.: 17/489,037

(22) Filed: Sep. 29, 2021

(65) Prior Publication Data

US 2023/0099052 A1  Mar. 30, 2023

(51) Int. Cl.
*B01D 35/30* (2006.01)
*F16L 15/00* (2006.01)
*B01D 29/11* (2006.01)

(52) U.S. Cl.
CPC .......... *B01D 35/306* (2013.01); *F16L 15/007* (2013.01); *F16L 15/008* (2013.01); *B01D 29/11* (2013.01); *B01D 2201/4092* (2013.01)

(58) Field of Classification Search
CPC .............. B01D 35/306; B01D 29/11; B01D 2201/4092; F16L 15/007; F16L 15/008
See application file for complete search history.

(56) References Cited

U.S. PATENT DOCUMENTS

| | | | | |
|---|---|---|---|---|
| 3,540,594 A * | 11/1970 | Sanderson | ........... | B01D 35/306 210/232 |
| 4,354,946 A * | 10/1982 | Warlick | ............... | B01D 35/147 219/205 |
| 4,406,784 A * | 9/1983 | Cochran | ............. | B01D 35/306 210/167.05 |
| 4,700,670 A * | 10/1987 | Schade | ................ | B01D 35/147 210/167.02 |
| 5,327,862 A * | 7/1994 | Bedi | .................. | F01M 11/0408 184/105.3 |
| 5,443,138 A * | 8/1995 | Bedi | .................. | F01M 11/0458 123/196 R |
| 6,729,364 B2 | 5/2004 | Few et al. | | |
| 7,726,343 B2 | 6/2010 | Shultz et al. | | |
| 8,202,422 B2 | 6/2012 | Wnuk et al. | | |
| 8,522,913 B2 | 9/2013 | Mussoi et al. | | |
| 10,195,554 B1 * | 2/2019 | Syren | ................... | B01D 35/306 |
| 2007/0267339 A1 * | 11/2007 | Munn | .................. | B01D 35/306 210/450 |
| 2017/0361253 A1 * | 12/2017 | Baxter | ................... | F01M 11/03 |
| 2020/0049289 A1 * | 2/2020 | Levy | ..................... | F16L 15/007 |
| 2021/0031127 A1 | 2/2021 | Buscicchio et al. | | |

* cited by examiner

*Primary Examiner* — David Bochna
(74) *Attorney, Agent, or Firm* — Kelly McGlashen; Maginot, Moore & Beck LLP (57) ABSTRACT

A filter adaptor joins a canister filter to a hydraulic manifold block. The adaptor includes a hexagonal tool-receiving portion, an outflow passageway and one or more inflow passageways. The outlet flow passageway extends between opposed ends of the adaptor, and is used to direct filtered fluid from the filter to the manifold block. The inlet flow passageway(s) extend between the one end and a sealed region of the adaptor, and are used to direct fluid from the manifold block to the filter. The adaptor includes auxiliary ports formed in the tool-receiving portion that communicate with the inlet flow passageways and permit monitoring thereof.

13 Claims, 5 Drawing Sheets

ADAPTOR FOR MOUNTING A FILTER TO A HYDRAULIC MANIFOLD

BACKGROUND

Hydraulic systems may incorporate hydraulic manifolds for the purpose of circuit design. Hydraulic manifolds are designed with internal cavities that define reservoirs or fluid passageways. In addition, a hydraulic manifold may include external mounting patterns that permit integration of valves, pumps, filters and/or other features into a hydraulic circuit. Typically, hydraulic circuits require filtration of the hydraulic fluid, and it may be necessary and/or advantageous to integrate the filter into the hydraulic manifold. For system pressures of 725 psi (50 bar) or less, a spin-on canister filter may be suitable for filtering the hydraulic fluid. The canister filter is an industry standard and is usually the most economical option from a cost standpoint. The canister filter may use British Standard Parallel Pipe (BSPP) threads (also known as "G threads") or fine threads of the Unified Thread Series (UNF) to attach the canister filter to a predefined threaded stud and sealing surface. The required pattern of the mounting interface is challenging to machine onto the hydraulic manifold surface, so that providing the hydraulic manifold with the mounting interface can be costly. For this reason, it is desirable to be able to easily join a canister filter to the hydraulic manifold without the challenges of and costs associated with providing the standard mounting interface.

SUMMARY

A filter adaptor is provided that easily joins the relatively inexpensive canister filter to a hydraulic manifold in a low cost way allowing the use of canister filters without the challenges of providing the standard mounting interface.

The adaptor includes a stud that protrudes from a first end thereof. The stud is concentric with the longitudinal axis and has a first external thread that is shaped and dimensioned to engage with an internal thread of the canister filter. The adaptor includes a second external thread that is disposed between the stud and a second end of the adaptor, and is shaped and dimensioned to engage with a corresponding internal connection structure of a cavity of the fluid manifold. The adaptor includes a circumferentially-extending first groove that is shaped and dimensioned to receive a first annular seal. The first annular seal provides a first fluid tight seal between the adaptor and a surface of the manifold cavity. The first groove is disposed between the stud and the second external thread. The adaptor includes a circumferentially-extending second groove that is shaped and dimensioned to receive a second annular seal. The second annular seal provides a second fluid tight seal between the adaptor and a surface of the manifold cavity. The second groove is disposed between second external thread and the second end, and the portion of the adaptor disposed between the first groove and the second groove corresponds to a sealed region of the adaptor. The adaptor includes a tool-receiving portion that is disposed between the first external thread and the first groove, and the tool-receiving portion has a polygonal cross-sectional shape. The adaptor includes an outflow passageway and one or more inflow passageways. The outlet flow passageway extends between the first end and the second end so as to pass through the sealed region without fluid communication with the sealed region, and is used to direct filtered fluid from the filter to the manifold. The inlet flow passageway(s) extend between the first end and the sealed region, and are used to direct fluid from the manifold block to the filter.

In addition, the adaptor includes one or more auxiliary ports that are axially located between the manifold and filter, and an auxiliary passageway that extends between each auxiliary port and the inlet flow passageway. The auxiliary ports provide access to fluid flow and/or provide external monitoring capability for the hydraulic circuit. Other uses not defined here, requiring access to inlet flow and pressure, are possible.

The number of auxiliary ports and auxiliary passageways is limited only to the number of inlet flow passageways that are present. Each auxiliary port opens along a flat side of the tool-receiving portion, and each auxiliary passageway intersects a respective one of the inlet flow passageways. The auxiliary passageways extend radially so as to be oriented perpendicularly to the respective inlet flow passageways. The perpendicular arrangement of auxiliary passageway(s) to the inlet flow passageways promotes unencumbered access and flexibility without additional adaptor complexity. Since they intersect the inlet flow passageways, the auxiliary passageways are exposed to inbound fluid flow and pressure. Unused ports can be capped using industry standard plugs.

By integrating the auxiliary port(s) with the filter adaptor, the hydraulic manifold machining requirements are further reduced. In addition, the auxiliary port(s) can be utilized immediately, or after commissioning, without the need to remove the filter adaptor or perform additional machining. The auxiliary port(s) provide a connection interface that conforms to an Industry standard, permitting connectivity to multiple devices. By placing the ports in the flat surfaces (e.g. "wrench flats") of the tool receiving portion rather than adding material to the adaptor's neck to provide a location for the auxiliary ports, the height of the adaptor can be minimized. Moreover, locating the ports on the flat surfaces of the tool receiving portion facilitates accurate manufacturing as compared to machining a curved surface.

In some aspects, an adapter includes a first end, and a stud that protrudes from the first end. An end face of the stud includes a first fluid port. The adaptor includes a second end. The second end is opposite the first end, and an end face of the second end includes a second fluid port. In addition, the adaptor includes an outlet flow passageway that extends between the first fluid port and the second fluid port. An outer surface of the adaptor includes a first connection structure provided on the stud, a second connection structure disposed between the first connection structure and the second end, and a tool-receiving portion disposed between the first connection structure and the second connection structure. The tool-receiving portion has a polygonal cross-sectional shape. An outer surface of the adaptor includes a circumferentially-extending first groove disposed between the tool-receiving portion and the second connection structure, the first groove configured to receive a portion of a first seal. In addition, an outer surface of the adaptor includes a circumferentially-extending second groove disposed between the second connection structure and the end face of the second end, the second groove configured to receive a portion of a second seal. The adaptor further includes a third fluid port that is disposed between the second connection structure and the second groove, a fourth fluid port that is disposed between the first connection structure and the tool receiving portion, and an inlet flow passageway that extends between the third fluid port and the fourth fluid port. The adaptor includes an auxiliary port that opens at a side of the tool-receiving portion, and an auxiliary passageway that extends between the auxiliary port and the inlet flow passageway.

In some embodiments, the auxiliary passageway is perpendicular to the inlet flow passageway.

In some embodiments, the outlet flow passageway is coaxial with a longitudinal centerline of the adaptor.

In some embodiments, the inlet flow passageway is disposed radially outward with respect to the outlet flow passageway.

In some embodiments, the outlet flow passageway is parallel to the inlet flow passageway.

In some embodiments, the inlet flow passageway comprises at least two inlet flow passageways.

In some embodiments, a sum of the combined cross sectional areas of the at least two inlet flow passageways is sufficient to accept a nominal flow rate of a filter that is connectable to the first connection structure.

In some embodiments, the at least two inlet flow passageways are spaced apart from each other along a cylindrical section that surrounds the outlet flow passageway, the cylindrical section having a first diameter, the outlet flow passageway having a second diameter that is less than the first diameter.

In some embodiments, the cylindrical section is concentric with a cross-section of the adapter that includes the outlet flow passageway.

In some embodiments, the adaptor includes a canister mounting flange that protrudes radially relative to a longitudinal centerline of the adaptor. The canister mounting flange is disposed between the first connection structure and the tool-receiving portion, and the fourth fluid port opens at a filter-facing surface of the canister mounting flange.

In some embodiments, the polygonal cross-sectional shape is a hexagon.

In some embodiments, the first connection structure and the second connection structure are external threads.

In some aspects, an adaptor is configured to connect a canister filter to a hydraulic manifold block. The adaptor includes a first end, a second end that is opposed to the first end, and a longitudinal axis that extends through the first and second ends. The adaptor includes a stud that protrudes from the first end. The stud is concentric with the longitudinal axis and has a first external thread. The first external thread is shaped and dimensioned to engage with an internal thread of the canister filter. The adaptor includes an external connection structure that is disposed between the stud and the second end. The external connection structure is shaped and dimensioned to engage with a corresponding internal connection structure of a cavity of the hydraulic manifold block. The adaptor includes circumferentially-extending first and second grooves. The first groove is shaped and dimensioned to receive a first annular seal, and the first groove is disposed between the stud and the external connection structure. The second groove is shaped and dimensioned to receive a second annular seal, and the second groove is disposed between the external connection structure and the second end. A portion of the adaptor that is disposed between the first groove and the second groove corresponds to a sealed region of the adaptor. The adaptor includes a tool-receiving portion that is disposed between the first connection structure and the first groove. The tool-receiving portion has a polygonal cross-sectional shape. The adaptor includes an outlet flow passageway that extends between the first end and the second end so as to pass through the sealed region without fluid communication with the sealed region, and an inlet flow passageway that extends between the first end and the sealed region. The adaptor includes an auxiliary port that opens at a side of the tool-receiving portion, and an auxiliary passageway that extends between the auxiliary port and the inlet flow passageway.

DETAILED DESCRIPTION

Figure 1:
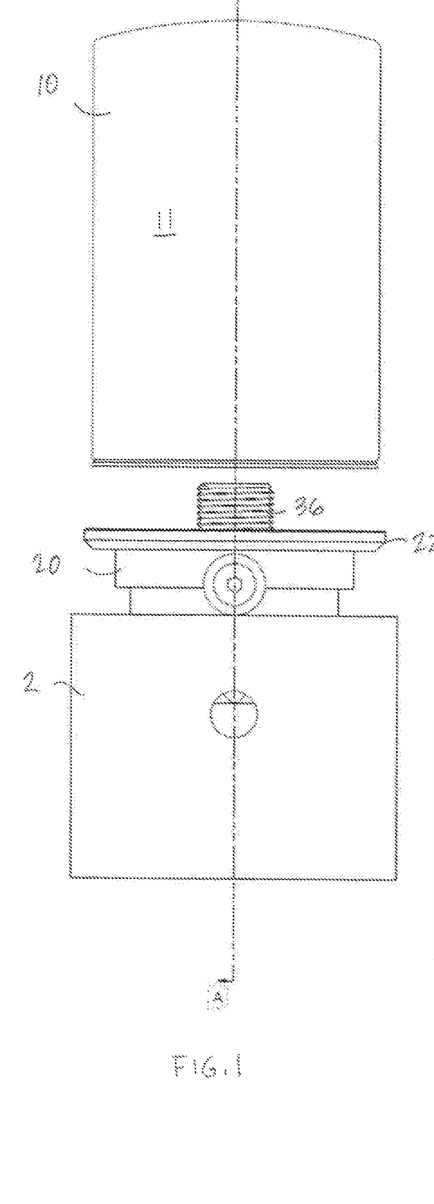
FIG. 1 is a partially exploded side view of a filter adaptor installed in a hydraulic manifold block and used to connect a canister filter to the hydraulic manifold block.
Figure 2:
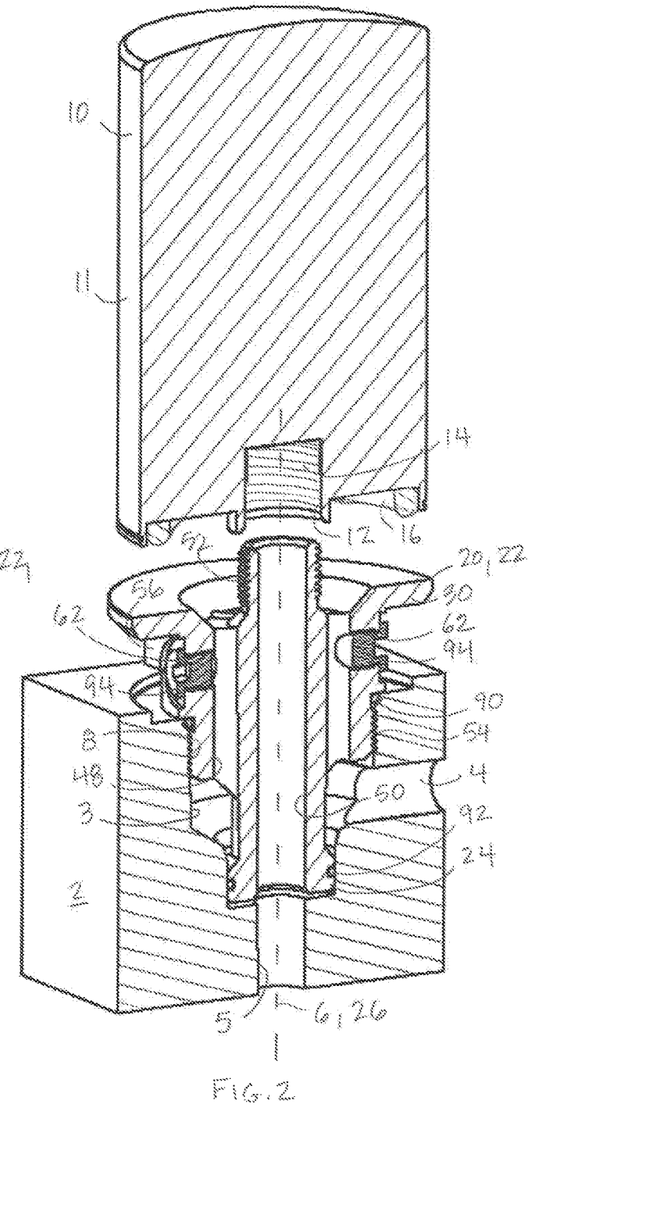
FIG. 2 is a cross-sectional view of the assembly of FIG. 1 as seen along line A-A of FIG. 1.
Figure 3:
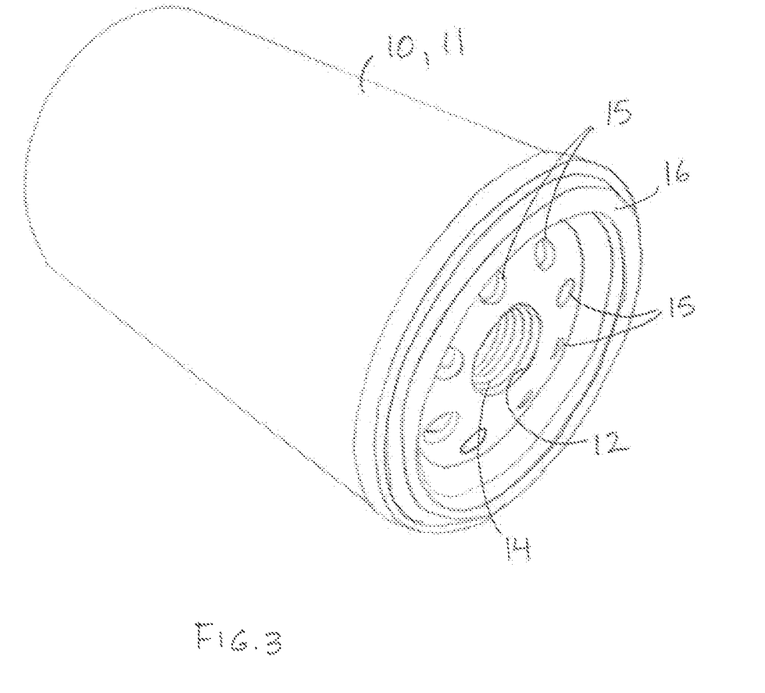
FIG. 3 is a bottom perspective view of a canister filter.

Referring to FIGS. 1-3, a hydraulic system may include a hydraulic manifold block 2 that provides fluid reservoirs and passageways, and that integrates valves, pumps, filters and/or other features (not shown) into a hydraulic circuit. A filter adaptor 20 is used to connect, and serves as an interface between, a hydraulic canister filter 10 and the hydraulic manifold block 2. More particularly, the filter adaptor 20 is detachably connected to a cavity 3 formed in the hydraulic manifold block 2 so that a stud 36 of the filter adaptor 20 is accessible from the exterior of the hydraulic manifold block 2, and the canister filter 10 is detachably connected to the adaptor stud 36. The filter adaptor 20 directs fluid flowing within the hydraulic circuit into the canister filter 10, and returns filtered hydraulic fluid from the canister filter 10 to the hydraulic circuit. In addition, the filter adaptor 20 includes one or more auxiliary ports 62 that permit connection of a monitoring device such as a sensor to the filter adaptor 20. Thus, the filter adaptor 20 can be configured to allow detection of the presence of fluid, detection of fluid properties such as temperature or pressure, and/or perform other circuit monitoring functions. The filter adaptor 20 is described in detail below.

In the illustrated embodiment, the canister filter 10 is a spin-on type hydraulic filter. The canister filter 10 may include a cylindrical metal housing 11 that is closed at both ends. A block-facing end of the housing 11 may include a filter central opening 12 through which filtered fluid exits the canister filter 10. The filter central opening 12 includes an internal thread 14 and provides an outlet from which filtered fluid exits the canister filter 10. The internal thread size depends on the requirements of the specific application, and common thread sizes include, but are not limited to, UNF 1-12, UNF 1-½-16, BSPP ¾, and BSPP 1-¼. The block-facing end of the housing 11 may include several filter inlet openings 15 that are small in area as compared to the area of the filter central opening 12. The filter inlet openings 15 are distributed around the filter central opening 12. A gasket 16 is provided on the block-facing end of the housing 11 which surrounds both the filter inlet openings 15 and the filter central opening 12.

Figure 4:
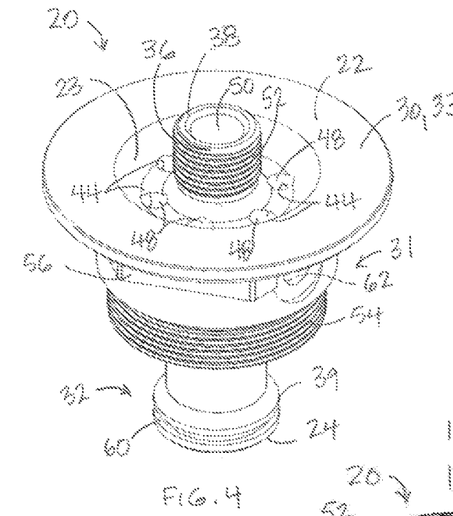
FIG. 4 is a perspective view of the filter adaptor.
Figure 5:
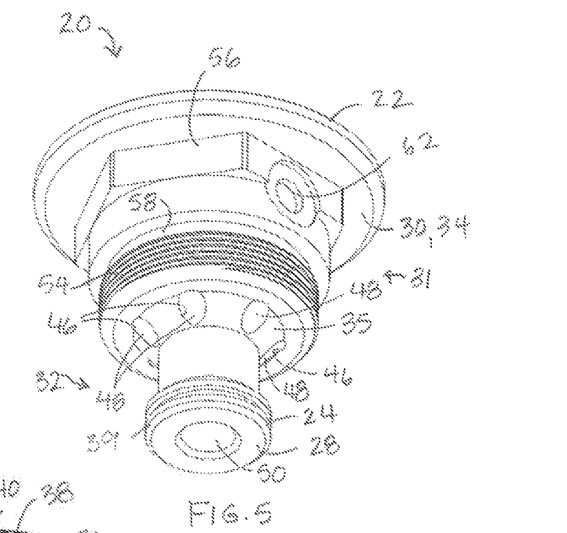
FIG. 5 is another perspective view of the filter adaptor of FIG. 4.
Figure 6:
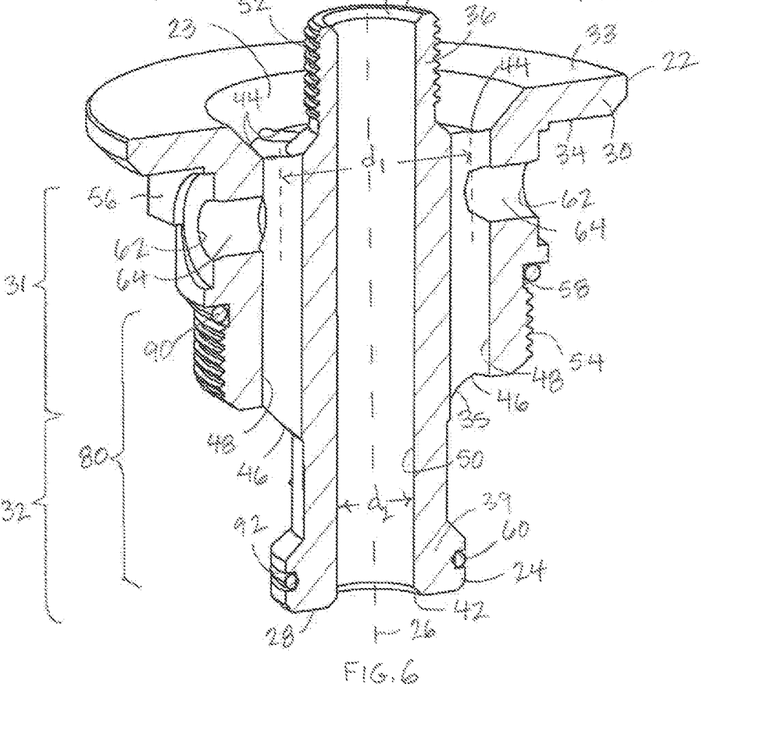
FIG. 6 is a cross-sectional view of the filter adaptor of FIG. 4.

Referring to FIGS. 4-6, the filter adaptor 20 is configured to provide an easily accessible and operable interface between a canister filter 10 and a hydraulic manifold block 2. The filter adaptor 20 is a rigid, generally cylindrical structure that includes a first end 22 that is configured to receive the canister filter 10, and a second end 24 that is opposite the first end 22 and is received within the cavity 3 of the hydraulic manifold block 2. The filter adaptor 20 includes a longitudinal centerline 26 that extends through the first and second ends 22, 24.

The filter adaptor 20 has a non-uniform outer diameter. In particular, the filter adaptor first end 22 includes a mounting flange 30 that extends radially outward relative to the longitudinal centerline 26. The filter adaptor 20 includes a mid-portion 31 that adjoins the mounting flange 30 and has an outer diameter that is less than that of the mounting flange 30. In addition, the filter adaptor 20 includes an insertion portion 32 that adjoins the mid-portion 31, includes the filter adaptor second end 24 and has an outer diameter that is less than that of the mid-portion 31. A shoulder 35 is formed at the transition in diameters between the mid-portion 31 and the insertion portion 32.

The mounting flange 30 provides a planar filter-facing surface 33 that, in use, supports and forms a fluid tight seal with a gasket 16 of the canister filter 10. In addition to the mounting flange 30, the filter adaptor first end 22 includes a stud 36 that is concentric with the longitudinal centerline 26 and protrudes axially outward from the first end 22 so as to protrude relative to the mounting flange 30. The filter-facing surface 33 of the mounting flange 30 includes a shallow annular recess 23 that surrounds the stud 36. An external surface of the stud 36 provides a first connection structure 52 for connecting the filter adaptor 20 to the canister filter 10. In the illustrated embodiment, the first connection structure 52 is an external helical or screw thread that is shaped and dimensioned to engage the filter canister internal thread 14.

The mid-portion 31 includes a tool-receiving portion 56, an annular first groove 58, and a second connection structure 54. The tool-receiving portion 56 adjoins the manifold block-facing surface 34 of the mounting flange 30, and has a polygonal cross-sectional shape to facilitate gripping by a tightening tool such as a wrench. In the illustrated embodiment, the tool-receiving portion 56 has a hexagonal cross-sectional shape. An external surface of the mid-portion 31 provides the second connection structure 54 for connecting the filter adaptor 20 to the hydraulic manifold block 2. In the illustrated embodiment, the second connection structure 54 is an external helical or screw thread that is shaped and dimensioned to engage a corresponding thread 8 provided in the hydraulic manifold block 2, as discussed in more detail below. In some embodiments, the thread that constitutes the second connection structure 54 may be configured to include, but is not limited to, one of the following thread sizes: UNF 2-½-12, M60×2, M68×2 The first groove 58 is disposed between the tool-receiving portion 56 and the second connection structure 54. The first groove 58 extends about the circumference of the mid-portion 31, and is configured to receive, and axially locate, a first seal 90 which may be an O-ring seal. In use, the first seal 90 forms a fluid-tight seal with a surface of a cavity 3 of the hydraulic manifold block 2.

The insertion portion 32 has a cylindrical shape, and includes an increased diameter portion 39 that adjoins the end face 28 of the adaptor second end 24. An annular second groove 60 is provided in the increased diameter portion 39 at a location that is closely adjacent to the end face 28 of the adaptor second end 24. The second groove 60 extends about the circumference of the insertion portion 32, and is configured to receive, and axially locate, a second seal 92 which may be an O-ring seal. In use, the second seal 92 forms a fluid-tight seal with the surface of the cavity 3 of the hydraulic manifold block 2.

The region between the first groove 58 and the second groove 60 is referred to as the sealed region 80 of the filter adaptor 20. In use, the first and second seals 90, 92 each form a fluid-tight seal with a surface of the cavity 3 of the hydraulic manifold block 2, whereby the portion of the side of the filter adaptor 20 corresponding to the sealed region 80 is isolated in fluid-sealed manner from the end face 28 of the adaptor second end 24 and from the end face 38 of the stud 36. In addition, although the second connection structure 54 and the shoulder 35 resides within the sealed region 80, the tool-receiving portion 56 is disposed outside the sealed region 80.

The filter adaptor 20 includes an outlet flow passageway 50 that extends between a first fluid port 40 provided in the end face 38 of the stud 36 and a second fluid port 42 provided in the end face 28 of the filter adaptor second end 24. The outlet flow passageway 50 is coaxial with a longitudinal centerline 26. In the illustrated embodiment, the outlet flow passageway 50 directs filtered fluid from the central opening 12 of the canister filter 10 to the hydraulic manifold block 2. The outlet flow passageway 50 may be sized to match the anticipated flow rate corresponding to the size of the canister filter 10 to be used with the filter adaptor 20.

The filter adaptor 20 includes at least two inlet flow passageways 48. In the illustrated embodiment, the filter adaptor includes six inlet flow passageways 48. Each inlet flow passageway extends between a respective one of several third fluid ports 44 disposed in the lowermost aspect of the recess 23 and a corresponding one of several fourth fluid ports 46 that open in the shoulder 35. The term "lowermost" is used herein with respect to the orientation of the filter adaptor 20 shown in FIG. 6, and is not intended to be limiting. Although the third fluid ports 44 are disposed outside the sealed region 80, the fourth fluid ports 46 reside within the sealed region 80. In the illustrated embodiment, the inlet flow passageways 48 direct unfiltered fluid from the hydraulic manifold block 2 to the inlet openings 15 of the canister filter 10.

The third and fourth fluid ports 44, 46 and the respective inlet flow passageways 48 are smaller in cross sectional area as compared to a cross-sectional area of the first and second fluid ports 40, 42 and the outlet flow passageway 50. In addition, the third and fourth fluid ports 44, 46 are spaced apart along a cylindrical section that passes through a center of each of the third and fourth fluid ports 44, 46. The cylindrical section surrounds the stud 36 and is concentric with a cross-section of the outlet flow passageway 50. In addition, the cylindrical section has a first diameter $d_1$, and the outlet flow passageway 50 has a second diameter $d_2$ that is less than the first diameter d1. By this configuration, the inlet flow passageways 48 are disposed radially outward with respect to the outlet flow passageway 50. In the illustrated embodiment, the outlet flow passageway 50 is parallel to the inlet flow passageways 48, and both the outlet and inlet flow passageways 48, 50 are parallel to the longitudinal centerline 26. In some embodiments, a sum of the cross-sectional areas of the inlet flow passageways 48 is less than or equal to a flow rate of the canister filter 10 that is configured to be connected to the first connection structure.

The filter adaptor 20 includes auxiliary ports 62 that open along the respective planar surfaces of the tool-receiving portion 56. In the illustrated embodiment, the filter adaptor 20 includes two auxiliary ports 62, which are disposed on opposite sides of the longitudinal centerline 26. It is understood, however, that the filter adaptor 20 may include more than two auxiliary ports 62. In the illustrated embodiment in which the tool receiving portion 56 has six sides, the filter adaptor 20 may include as many as six auxiliary ports 62. Each auxiliary port 62 is connected to a respective one of the inlet flow passageways 48 via an auxiliary passageway 64. In the illustrated embodiment, each auxiliary passageway 64 extends radially so as to be perpendicular to the corresponding inlet flow passageway 48. In some embodiments, the auxiliary ports 62 may be threaded. In some embodiments, the thread may conform to an Industry Standard, permitting the auxiliary port 62 to be used to connect a variety of different devices to the filter adaptor 20.

Figure 10:
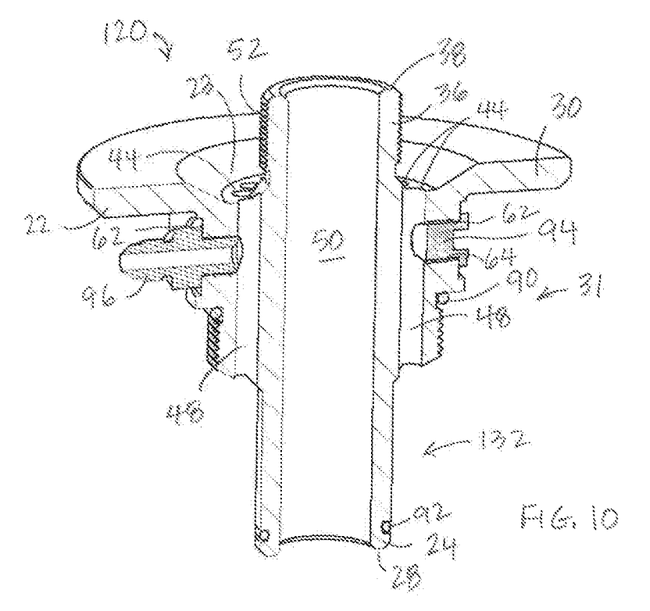
FIG. 10 is a cross-sectional view of the alternative embodiment filter adaptor of FIG. 7, shown with a plug disposed in one auxiliary passageway, and a monitoring device fitting disposed in another auxiliary passageway.
Figure 11:
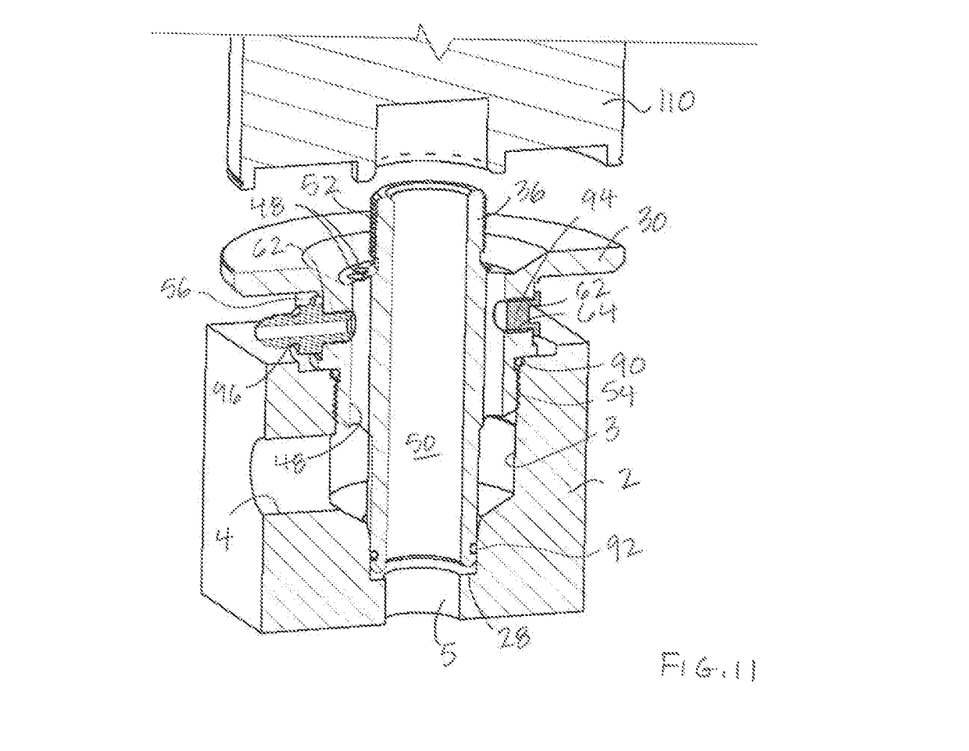
FIG. 11 is a partially exploded cross-sectional view of the alternative embodiment filter adaptor of FIG. 7 installed in a hydraulic manifold block and used to connect a relatively larger canister filter to the hydraulic manifold block, shown with a plug disposed in one auxiliary passageway, and a monitoring device fitting disposed in another auxiliary passageway.

Referring to FIGS. 10 and 11, each of the auxiliary ports 62 may be initially plugged with an Industry Standard plug 94. Removal of the plug 94 from a respective port 62 enables introduction of a circuit monitoring functional device or a fluid collection device (collectively referred to here as device 96) into the auxiliary port 62. The auxiliary port(s) 62 can be utilized immediately, or after commissioning, without the need to remove the filter adaptor 20 from the hydraulic manifold block 2 or perform additional machining.

The hydraulic manifold block 2 may include a predefined cavity 3. The cavity 3 may be machined into the hydraulic manifold block 2 along a drilling axis 6. A lateral side of the cavity 3 may include an internal thread 8 that is used to form a connection with the filter adaptor 20. The cavity 3 may be manufactured to match the specific size and type (e.g., UNF or Metric) of the adaptor 20. For example, the cavity internal thread 8 may be manufactured to accommodate the shape and dimensions of the adaptor second connection structure (e.g., second threads) 54. Likewise, the shape and dimensions of the cavity lower sealing surface may be manufactured to accommodate the shape and dimensions of the adaptor second end 24 including the second seal 92.

The cavity 3 may be connected to a passageways within the hydraulic manifold block 2. For example, the cavity 3 may be associated with two manifold block passageways, including a block inlet passageway 4 that opens on the lateral side of the cavity 3 and a block outlet passageway 5 that opens on the bottom of the cavity 3. The block inlet passageway 4 is located at a right angle to the cavity drilling axis 6 and directs fluid into the sealed region 80 between the first and second seals 90, 92. The size of the block inlet and outlet passageways 4, 5 can vary based on anticipated fluid flow rates; however, they vary within the scope and safe practices of machining manifolds and assuring the integrity of both the first and second seals 90, 92.

In use, the filter adaptor 20 is inserted into the cavity 3, threaded onto the internal thread 8, and tightened with a wrench applied to the tool-receiving portion 56. In particular, the adaptor 20 is secured via the integrated tool-receiving portion 56 at a specified torque. A canister filter 10 is subsequently installed on the adaptor 20 by threading the canister internal thread 14 onto the external thread 52 of the adaptor stud 36. The filter canister 10 is screwed onto the adaptor's threaded stud 36 until a positive seal is made between the canister filter gasket 16 and the filter-facing surface 33 of the adaptor mounting flange 30.

Referring to FIGS. 7-11, the filter adaptor 20 may be manufactured in several different sizes to fit multiple industry standard (spin-on) filters, both SAE and Metric. Filter adaptors of differing sizes may include structural variations. For example, the filter adaptor 20 described above with respect to FIGS. 1, 2 and 4-6 may be suitable for use with a relatively small canister filter 10. An alternative embodiment filter adaptor 120 may be suitable for use with a relatively larger filter canister 110. Although larger in size, the filter adaptor 120 that is used with the relatively larger filter canister 110 is similar in shape and structure to the filter adapter 20 described above with respect to FIGS. 1, 2 and 4-6, and common reference numbers are used to refer to common elements.

The filter adaptor 120 that is used with the relatively larger filter canister 110 differs from the earlier-described filter adaptor 20 in that the inlet and outlet flow passageways 48, 50 of the filter adaptor 120 are larger in diameter than that of the earlier described filter adaptor 20, whereby the diameters of the mounting flange 30, the stud 36, the mid portion 31 and the insertion portion 132 of the filter adaptor 120 are correspondingly larger, and an axial length of the insertion portion 132 of the filter adaptor 120 is longer, that of the earlier described filter adapter 20.

Figure 7:
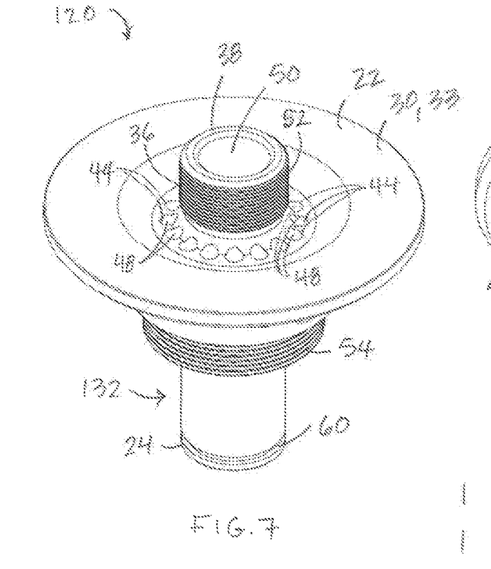
FIG. 7 is a perspective view of an alternative embodiment filter adaptor.
Figure 8:
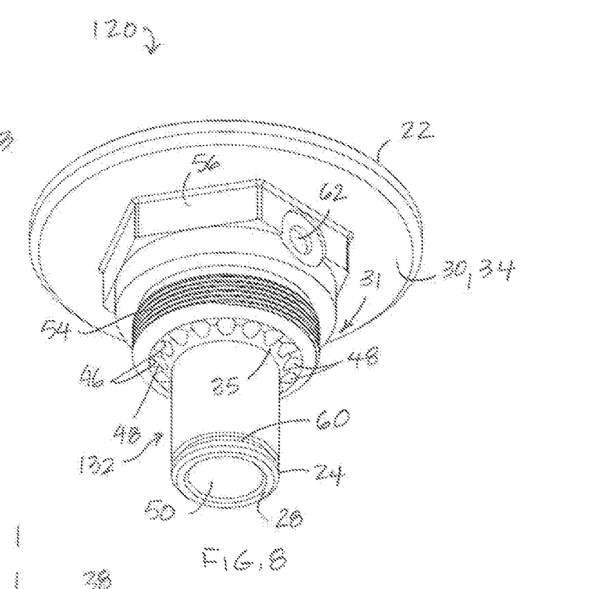
FIG. 8 is another perspective view of the alternative embodiment filter adaptor of FIG. 7.
Figure 9:
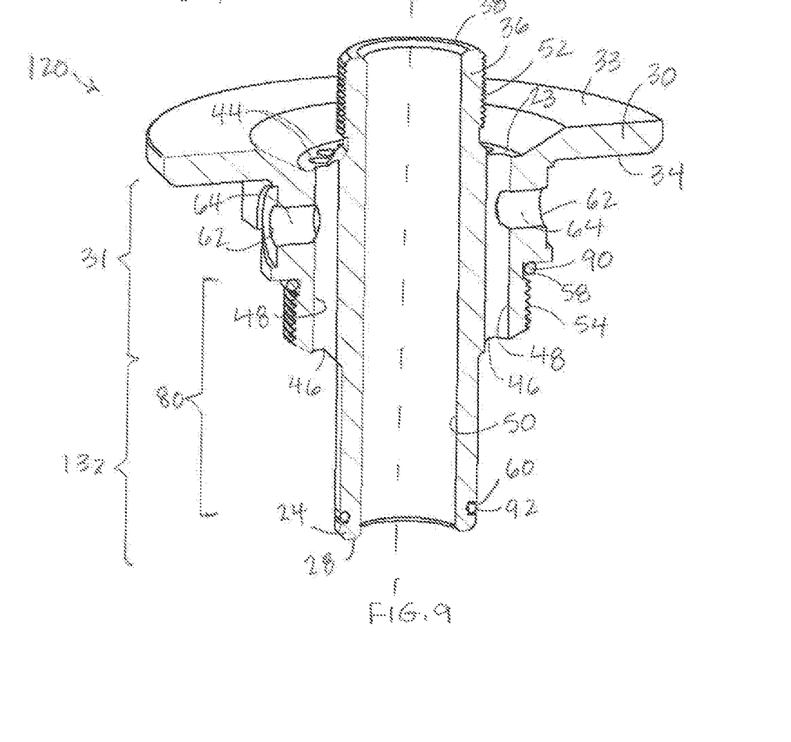
FIG. 9 is a cross-sectional view of the alternative embodiment filter adaptor of FIG. 7, shown with the auxiliary passageways open.

The filter adaptor 120 that is used with the relatively larger filter canister 110 differs from the earlier-described filter adaptor 20 in that the filter adaptor 120 of FIGS. 7-9 includes a greater number of inlet flow passageways 48 that that of the earlier-described filter adaptor 20. For example, in the illustrated embodiment, the filter adaptor 120 includes sixteen inlet flow channels 48, of which two of the sixteen inlet flow channels 48 are in fluid communication with an auxiliary port 62.

In addition, the filter adaptor 120 that is used with the relatively larger filter canister 110 differs from the earlier-described filter adaptor 20 in that the insertion portion 132 of the filter adaptor 120 omits the increased diameter portion 39, and instead has a uniform outer diameter between the shoulder 35 and the adaptor second end 24.

Although the first connection structure 52 and the second connection structure 54 are described herein as being a screw or helical thread, the first and second connection structures 52, 54 are not limited to this structure. For example, in other embodiments, one or both of the first and second connection structures 52, 54 may be a different type of mechanical connection, such as a bayonet connection, a cammed connection or snap-fit connection.

Selective illustrative embodiments of the adaptor are described above in some detail. It should be understood that only structures considered necessary for clarifying the adaptor have been described herein. Other conventional structures, and those of ancillary and auxiliary components of the hydraulic system, the hydraulic manifold block and the adaptor, are assumed to be known and understood by those skilled in the art. Moreover, while a working example of the adaptor has been described above, the adaptor is not limited to the working example described above, but various design alterations may be carried out without departing from the adaptor as set forth in the claims.

We claim:

1. An adapter comprising:
   a first end;
   a stud that protrudes from the first end, an end face of the stud including a first fluid port;
   a second end, the second end opposite the first end, an end face of the second end including a second fluid port; and
   an outlet flow passageway that extends between the first fluid port and the second fluid port;
   an outer surface of the adaptor including
      a first connection structure provided on the stud,
      a second connection structure disposed between the first connection structure and the second end,
      a tool-receiving portion disposed between the first connection structure and the second connection structure, the tool-receiving portion having a polygonal cross-sectional shape,
      a circumferentially-extending first groove disposed between the tool-receiving portion and the second connection structure, the first groove configured to receive a portion of a first seal,
      a circumferentially-extending second groove disposed between the second connection structure and the end face of the second end, the second groove configured to receive a portion of a second seal,
   wherein
   the adaptor further includes:
      a third fluid port that is disposed between the second connection structure and the second groove;
      a fourth fluid port that is disposed between the first connection structure and the tool receiving portion;
      an inlet flow passageway that extends between the third fluid port and the fourth fluid port,
      an auxiliary port that opens at a side of the tool-receiving portion, and
      an auxiliary passageway that extends between the auxiliary port and the inlet flow passageway.

2. The adaptor of claim 1, wherein the auxiliary passageway is perpendicular to the inlet flow passageway.

3. The adaptor of claim 1, wherein the outlet flow passageway is coaxial with a longitudinal centerline of the adaptor.

4. The adaptor of claim 1, wherein the inlet flow passageway is disposed radially outward with respect to the outlet flow passageway.

5. The adaptor of claim 1, wherein the outlet flow passageway is parallel to the inlet flow passageway.

6. The adaptor of claim 1, wherein the inlet flow passageway comprises at least two inlet flow passageways.

7. The adaptor of claim 6, wherein a sum of the combined cross sectional areas of the at least two inlet flow passageways is sufficient to accept a nominal flow rate of a filter that is connectable to the first connection structure.

8. The adaptor of claim 6, wherein the at least two inlet flow passageways are spaced apart from each other along a cylindrical section that surrounds the outlet flow passageway, the cylindrical section having a first diameter, the outlet flow passageway having a second diameter that is less than the first diameter.

9. The adaptor of claim 8 wherein the cylindrical section is concentric with a cross-section of the adapter that includes the outlet flow passageway.

10. The adaptor of claim 1, comprising a canister mounting flange that protrudes radially relative to a longitudinal centerline of the adaptor, the canister mounting flange disposed between the first connection structure and the tool-receiving portion, and wherein the fourth fluid port opens at a filter-facing surface of the canister mounting flange.

11. The adaptor of claim 1, wherein the polygonal cross-sectional shape is a hexagon.

12. The adaptor of claim 1, wherein the first connection structure and the second connection structure are external threads.

13. An adaptor for connecting a canister filter to a hydraulic manifold block, the adaptor comprising:
   a first end;
   a second end that is opposed to the first end,
   a longitudinal axis that extends through the first and second ends,
   a stud that protrudes from the first end, the stud being concentric with the longitudinal axis and having a first external thread, the first external thread shaped and dimensioned to engage with an internal thread of the canister filter;
   an external connection structure that is disposed between the stud and the second end, the external connection structure shaped and dimensioned to engage with a corresponding internal connection structure of a cavity of the hydraulic manifold block;
   a circumferentially-extending first groove that is shaped and dimensioned to receive a first annular seal, the first groove disposed between the stud and the external connection structure;
   a circumferentially-extending second groove that is shaped and dimensioned to receive a second annular seal, the second groove disposed between the external connection structure and the second end, a portion of the adaptor disposed between the first groove and the second groove corresponding to a sealed region of the adaptor;
   a tool-receiving portion disposed between the first connection structure and the first groove, the tool-receiving portion having a polygonal cross-sectional shape,
   an outlet flow passageway that extends between the first end and the second end so as to pass through the sealed region without fluid communication with the sealed region;
   an inlet flow passageway that extends between the first end and the sealed region;
   an auxiliary port that opens at a side of the tool-receiving portion, and
   an auxiliary passageway that extends between the auxiliary port and the inlet flow passageway.

* * * * *